May 25, 1937.  J. KAHN  2,081,358
HIGHWAY TRAFFIC MARKER
Filed Sept. 24, 1932  7 Sheets-Sheet 1

Inventor
Julius Kahn,
By
Attorney

May 25, 1937.  J. KAHN  2,081,358
HIGHWAY TRAFFIC MARKER
Filed Sept. 24, 1932   7 Sheets-Sheet 3

Inventor
Julius Kahn,
By
Attorney

May 25, 1937.  J. KAHN  2,081,358
HIGHWAY TRAFFIC MARKER
Filed Sept. 24, 1932  7 Sheets-Sheet 6

Inventor
Julius Kahn,
By
Attorney

Patented May 25, 1937

2,081,358

UNITED STATES PATENT OFFICE 2,081,358

HIGHWAY TRAFFIC MARKER

Julius Kahn, Youngstown, Ohio, assignor to Truscon Steel Company, Youngstown, Ohio, a corporation of Michigan Application September 24, 1932, Serial No. 634,746

14 Claims. (Cl. 94—1.5)

The utilization of traffic markers in longitudinal lines along highways and particularly when these markers are to be employed at or adjacent the expansion joints or lines of cleavage, such as are now ordinarily produced in concrete roads, has proven a problem. If these marking members are embedded in the surfaced portion of the roadway and bridge the joint, when contraction and expansion of the roadway takes place, the marking implements acting as ties across the expansion joint break out the portions of the concrete or other material in which they are embedded and themselves become loose so that a two-fold defect in the roadway results.

The invention in one aspect is addressed to this problem, the object being to provide a traffic marking means which can be located along a line of cleavage of the roadway and will be capable of movement with the portions of the roadway adjacent to the joint or line of cleavage, so that they themselves remain firmly in place and no rupture of the roadway structure will take place by reason of their presence.

A further object is to provide a structure of this type that may thus employ as its anchoring means, the cleavage-creating strip normally provided for determining the line of the expansion joint.

A still further object is to provide a novel structure, which while adapted particularly for the above uses, may be employed wherever it is desired to use traffic guides or markers.

In the accompanying drawings are illustrated several embodiments of the invention that exemplify the same as preferred forms of construction.

Referring first to the structure shown in Figures 1–8 inclusive, a portion of a roadway is shown at 29, and may be of concrete or other well-known material. Embedded longitudinally and centrally in this roadway is a cleavage-creating strip 30 which may be of any desired or well-known form, but as indicated is a flat plate of less width than the thickness of the road-bed and placed on edge below the surface thereof. As is well-known to those skilled in the art these plates are employed for determining a line of cleavage or rupture created by the expansion and contraction of the material of the roadway. When not employed these lines may extend in various directions, resulting in irregular cracks. In the present structure the plates have upstanding laterally offset prongs 31 struck alternately from their opposite sides, and being embedded in the material on opposite sides of the plate, serve to secure the same against displacement and particularly in an upward direction.

In the present embodiment this cleavage-creating strip 30 is made to serve the additional function of anchoring means for sets of marking members. While each set may in a measure be considered as a unit or "button", they are actually individual elements arranged in coacting relation.

Figures 1, 2:
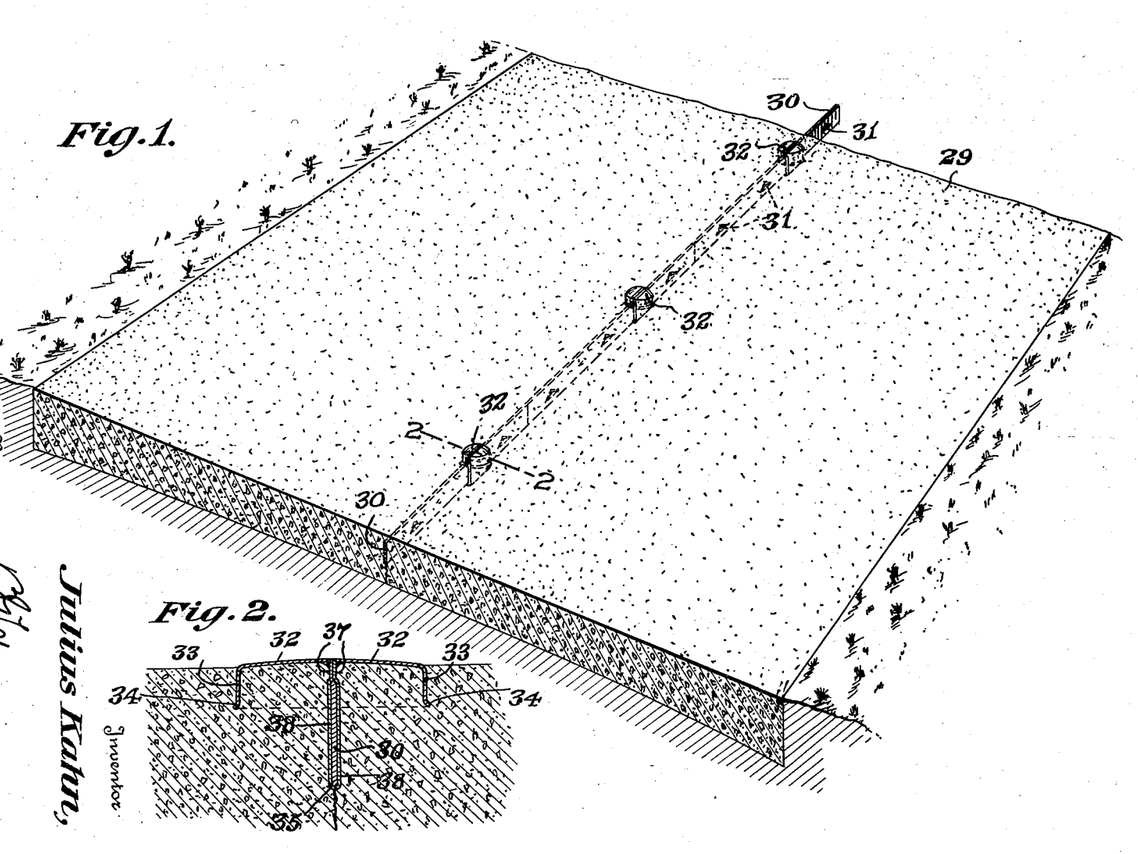
Figure 1 is a perspective view of a portion of a roadway equipped with the traffic markers or guides.
Figure 2 is a detail cross sectional view on the line 2—2 of Figure 1.
Figures 3, 4, 5, 6, 7, 8:
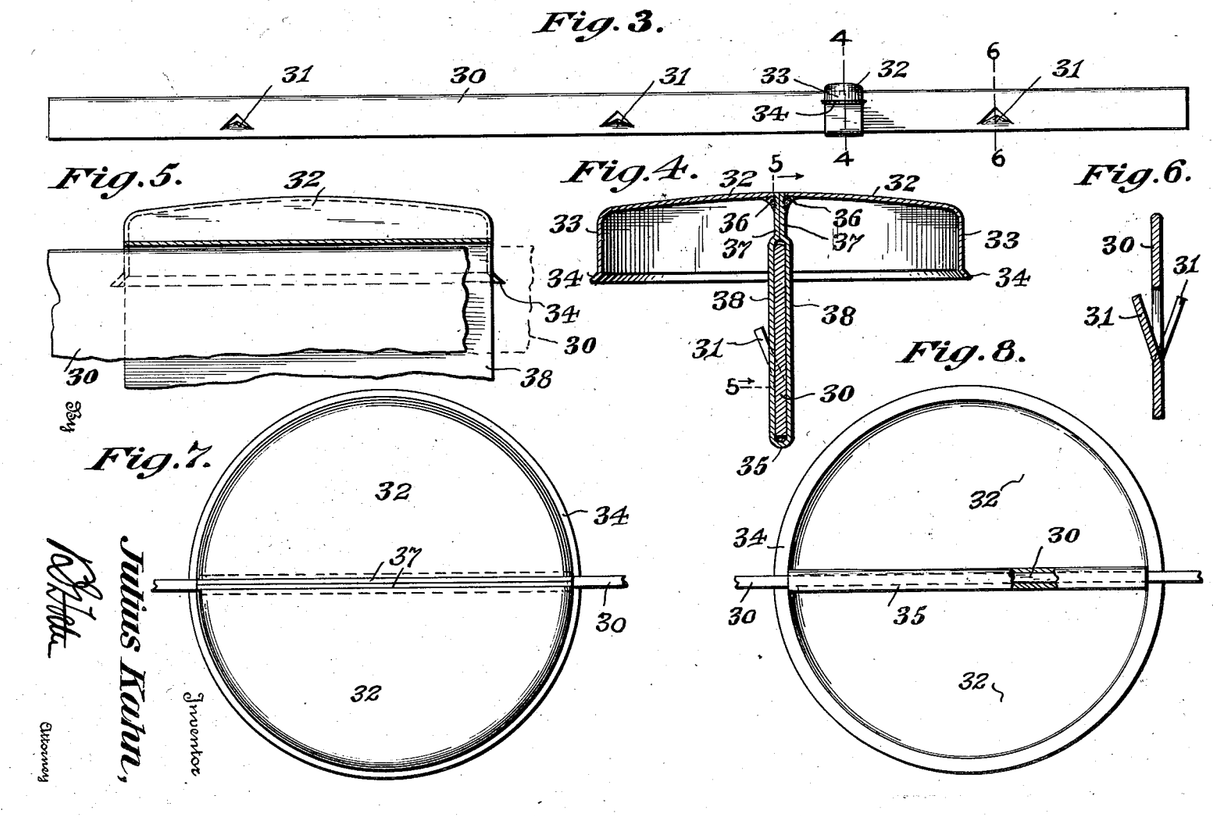
Figure 3 is a side elevation of the cleavage-creating plate or strip and showing one set of marking members thereon.
Figure 4 is a cross sectional view on the line 4—4 of Figure 3.
Figure 5 is a detail sectional view on the line 5—5 of Figure 4.
Figure 6 is a cross sectional view on the line 6—6 of Figure 3.
Figure 7 is a top plan view of a coacting set of marker members.
Figure 8 is a bottom plan view of the same.
Figures 9, 10, 11, 12, 13:
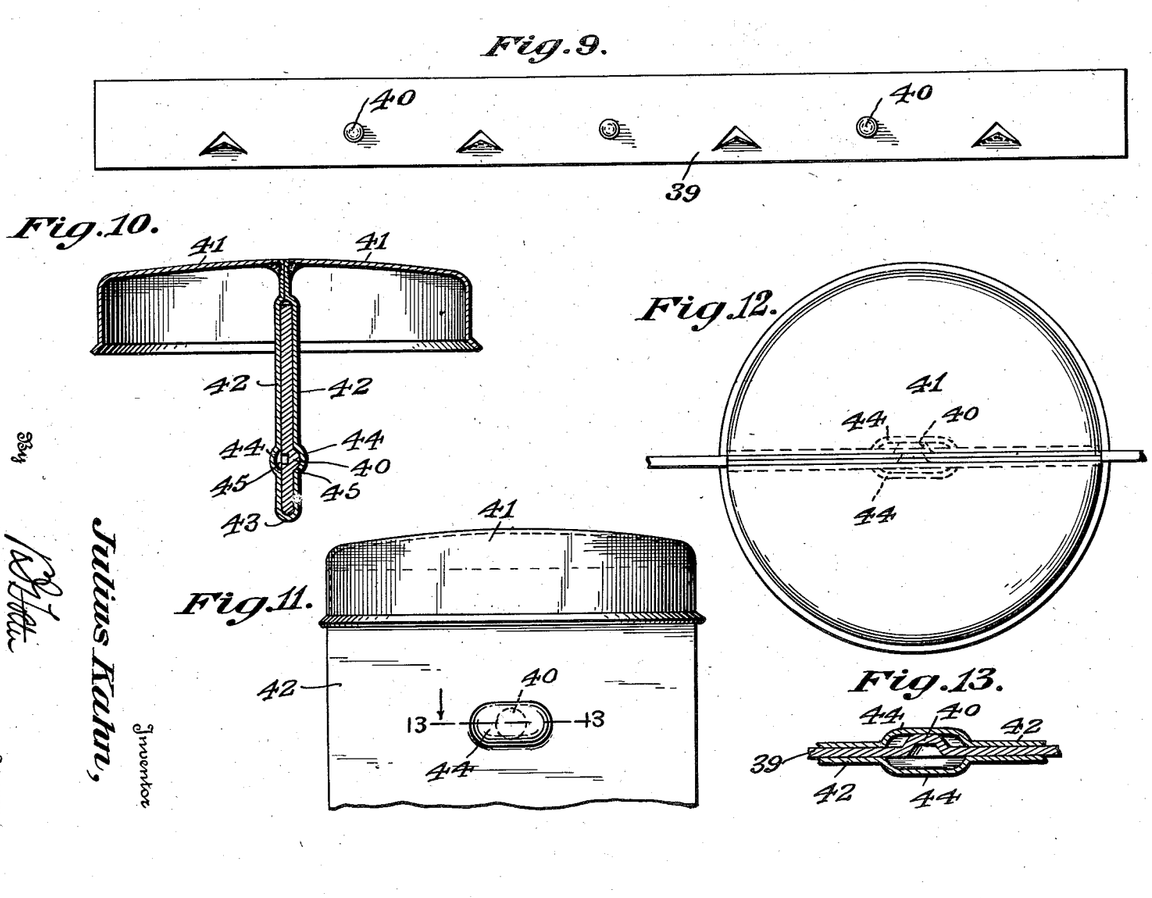
Figure 9 is a side elevation of a combined anchor and cleavage-creating strip of modified form.
Figure 10 is a cross sectional view of the same, showing a set of members thereon.
Figure 11 is a side elevation of the assemblage shown in Figure 10.
Figure 12 is a top plan view of the same.
Figure 13 is a cross sectional view on the line 13—13 of Figure 11.
Figures 14, 15, 16, 17, 18:
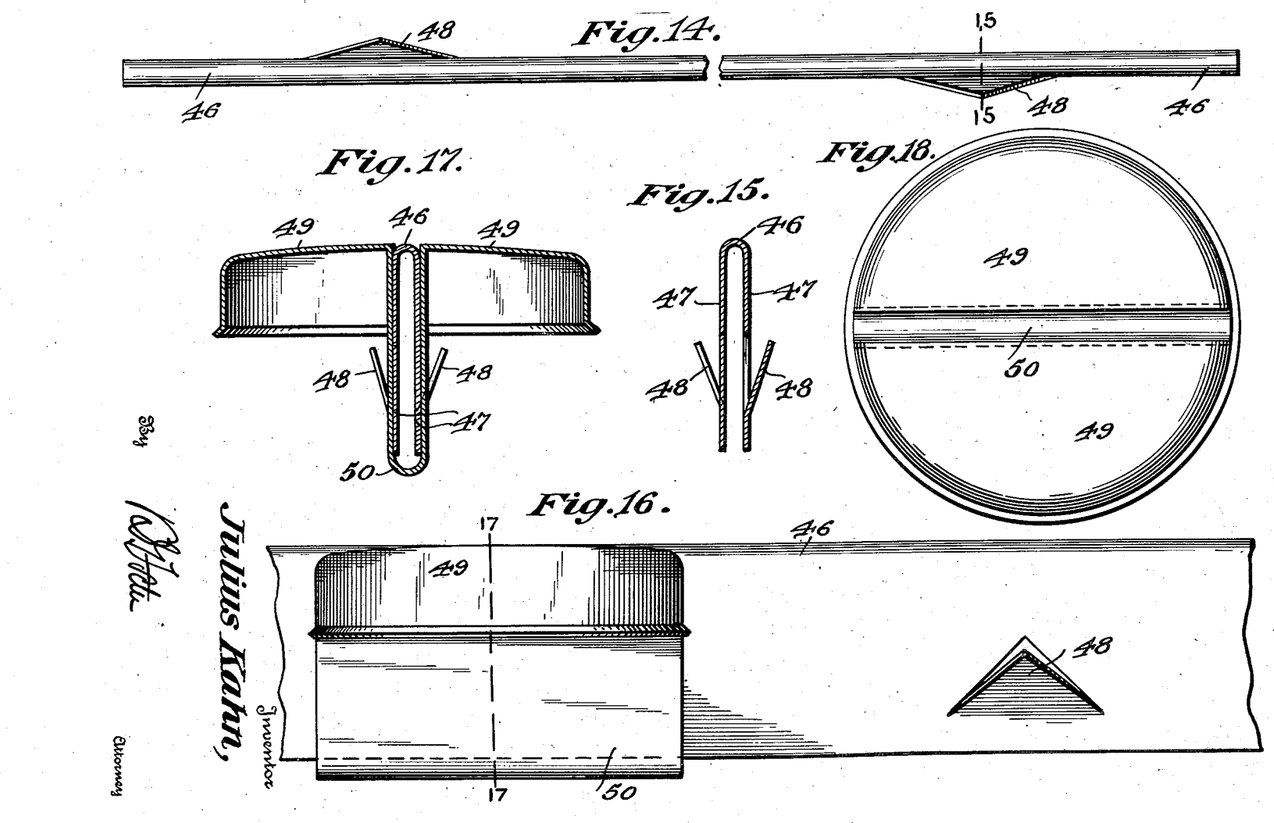
Figure 14 is a top plan view of another form of strip.
Figure 15 is a cross sectional view of the same on the line 15—15 of Figure 14.
Figure 16 is a side elevation showing a set of marker members thereon.
Figure 17 is a cross sectional view on the line 17—17 of Figure 16.
Figure 18 is a top plan view of a set of the members.
Figure 19:
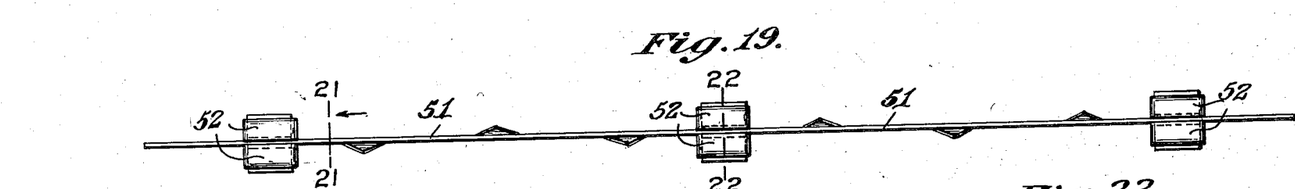
Figure 19 is a plan view of an assemblage of a different embodiment of the invention.
Figure 20:
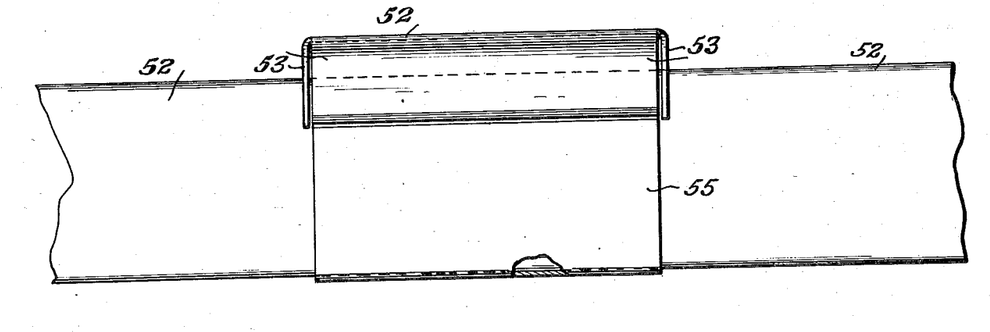
Figure 20 is a side elevation of a portion of the structure shown in Figure 19.
Figure 21:
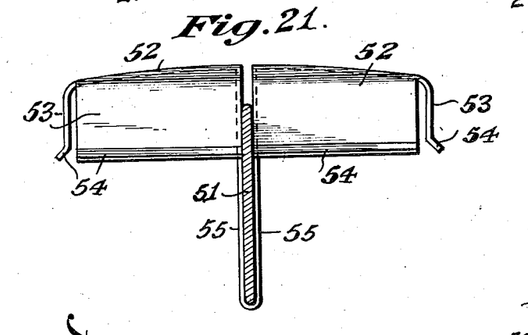
Figures 21 and 22 are sectional views taken respectively on the lines 21—21 and 22—22 of Figure 19.
Figure 22:
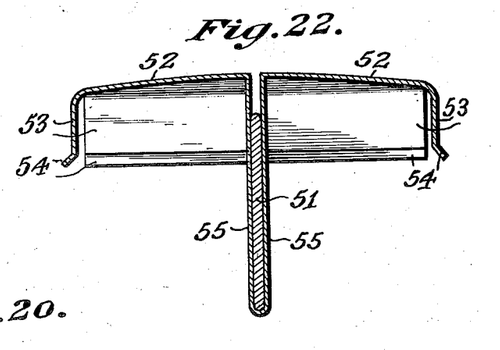

Each of these consists of a semi-circular, partly crowned top wall 32 preferably of some well-known metal that will receive and retain a polish, so that it will have outstanding visibility. Each of these plates has integral depending outer marginal skirts 33, whose lower free edges may be slightly outturned as shown at 34. The marking members of each set are connected by depending loops or yokes 35 attached to the adjacent inner edges. The yokes may be of separate pieces welded to the top walls, as shown at 36, or integral therewith. The upper portions 37 of the side arms 38 of the yoke may be formed so as to abut but the lower portions are spaced apart and these portions are of a length sufficient to receive between them the cleavage-creating strip or plate 30 as shown in Figure 4.

It will be evident that any number of sets of these marking members may be slipped on to the anchor or cleavage strip, and that they may be spaced at any distance desired by the road engineer. When assembled the structure can be embedded in the soft concrete or other roadway material until the top walls 32 are substantially flush with the surface of the roadway. The skirts 33 are thus embedded also in the material and the strip 30 has its upper edge below the surface.

With this structure in place it will be evident that when the material of the roadway contracts a longitudinal fracture will take place along the line of the strip, forming the roadway into two sections on either side of the same. In one of these sections one line of traffic marker members will be embedded and on the other side of the line or joint will be the successive series of the other marker members. Consequently as the roadway sections expand and contract these members will move with them and laterally of the strip inasmuch as the arms of the yoke have sufficient resiliency to permit the movement. Therefore the only breakage that will take place by reason of the use of the structure will be a production of the expansion joint, the marker members remaining rigidly embedded in the material of the roadway.

While the structure is particularly adapted for employment with cleavage strips, it will be evident that marking means constructed as above are useful whether anchored by cleavage strips or by other means along or adjacent to an expansion joint, and on the other hand it will also be obvious that a structure of this kind may be employed for anchoring traffic markers of the novel form shown in other places than expansion joints.

The invention may be modified in various ways from that above explained. Thus in Figures 9-13 inclusive the cleavage or anchor strip is shown at 39 and is provided at intervals with outstruck lugs 40. The sets of members 41, which may be substantially like those already described, have the side arms 42 of their yokes 43 provided with outset portions 44, providing internal pockets 45 to receive the lugs 40. This provides a convenient means for holding the sets of members at predetermined points on the strips.

In the exemplification of the invention shown in Figures 14-18 inclusive the parting or cleavage strip is designated 46 and is shown of substantially U-form in cross section, each of the side walls 47 having the outstruck tongues or spurs 48. In this form of construction the top of the strip may be at or substantially at the surface of the roadway. The sets of marker members 49 have yokes 50 that embrace the strip, the yokes preferably being such that the top walls of the members will be at the level of the top edge of the strip.

In the preceding disclosures each set of members together constitute a substantially circular "button", but their forms may be varied. Thus in Figures 19-22 inclusive the strip is designated 51. The sets of traffic marker members consist of rectangular top walls 52 with downturned flanges 53 that form skirts, with their lower margins outturned, as shown at 54. Each set is connected by a yoke 55 that embraces the strip 51, as shown.

Figure 23:
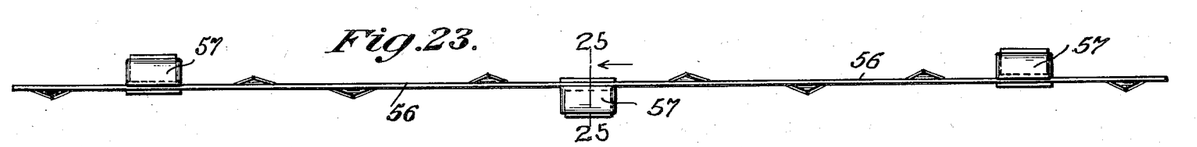
Figure 23 is a plan view of another embodiment of the invention.

If desired a single member may be employed at each location and these may be placed alternately on opposite sides of the strip as shown in Figure 23. In this form of construction the strip is designated 56 and each member is designated 57. It is shown as rectangular, but obviously it may be semi-circular, or of any other form desired. It may be attached to the strip in various ways.

Figures 24, 25, 26, 27, 28:
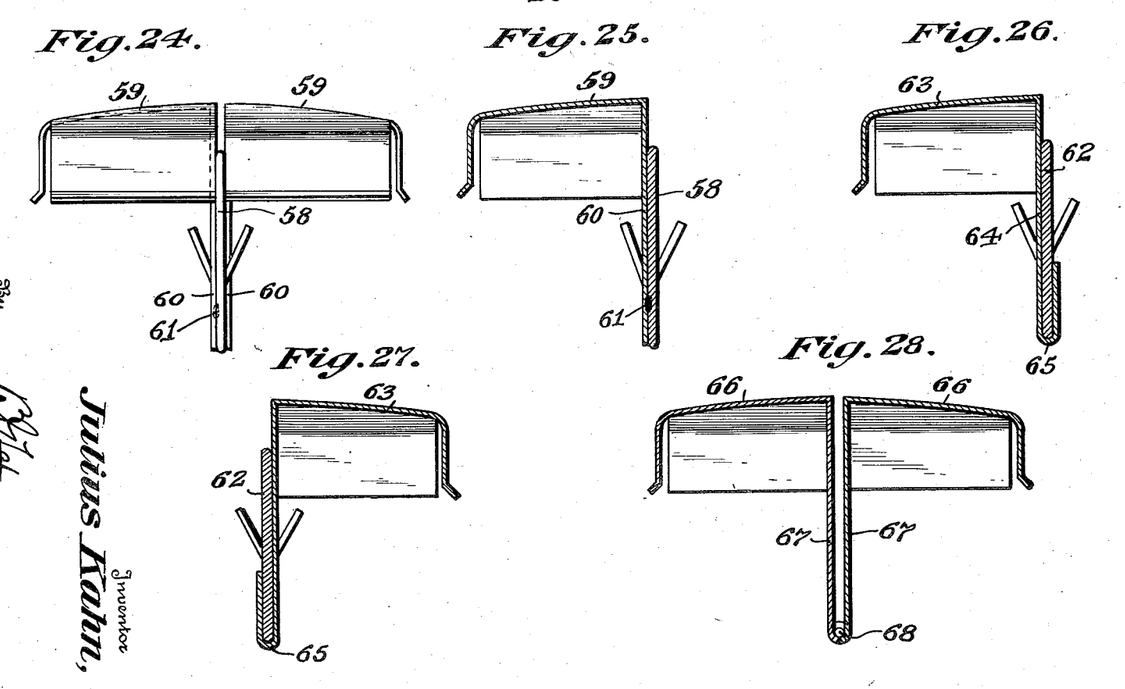
Figure 24 is an end elevation of the same.
Figure 25 is a sectional view on the line 25—25 of Figure 23.
Figure 26 is a sectional view showing a modified form of construction.
Figure 27 is a sectional view showing a coacting member that may be employed with the form shown in Figure 26.
Figure 28 is a vertical sectional view through another embodiment of the marker members.

Thus in Figures 24 and 25 the strip is shown at 58, and the marking member 59 of the form already described is located on one side of the same and has a depending arm 60 which lies alongside the strip and has its lower portion connected as by spot welding (shown at 61) to the lower portion of the strip. This it will be noted will allow the necessary play of the marking member laterally toward and from the strip as the concrete or other roadway body moves due to expansion and contraction.

In Figure 26 the strip is designated 62. The marking member is identified by the reference numeral 63. This latter has a depending arm 64 terminating in a hook 65 that embraces the lower portion of the strip. These may be placed on either side of the strip as will be clear by a comparison of Figures 26 and 27.

Still another form that the units may take is illustrated in Figure 28, wherein two coacting members 66 are provided with depending arms 67 that are hinged together at their lower ends as shown at 68, forming a yoke that will embrace the strip or other anchoring device.

In all these forms it will be clear that the strip is readily applicable to a roadway, and when in place and the material has hardened, not only are the markers effectively secured in place, but their relation is such that expansion and contraction along a definite line of cleavage can take place, and these devices so located adjacent the same will not only not interfere with the movement of the roadway body portions or sections, but will move with them and remain properly embedded without rupturing the material.

Figures 29, 30:
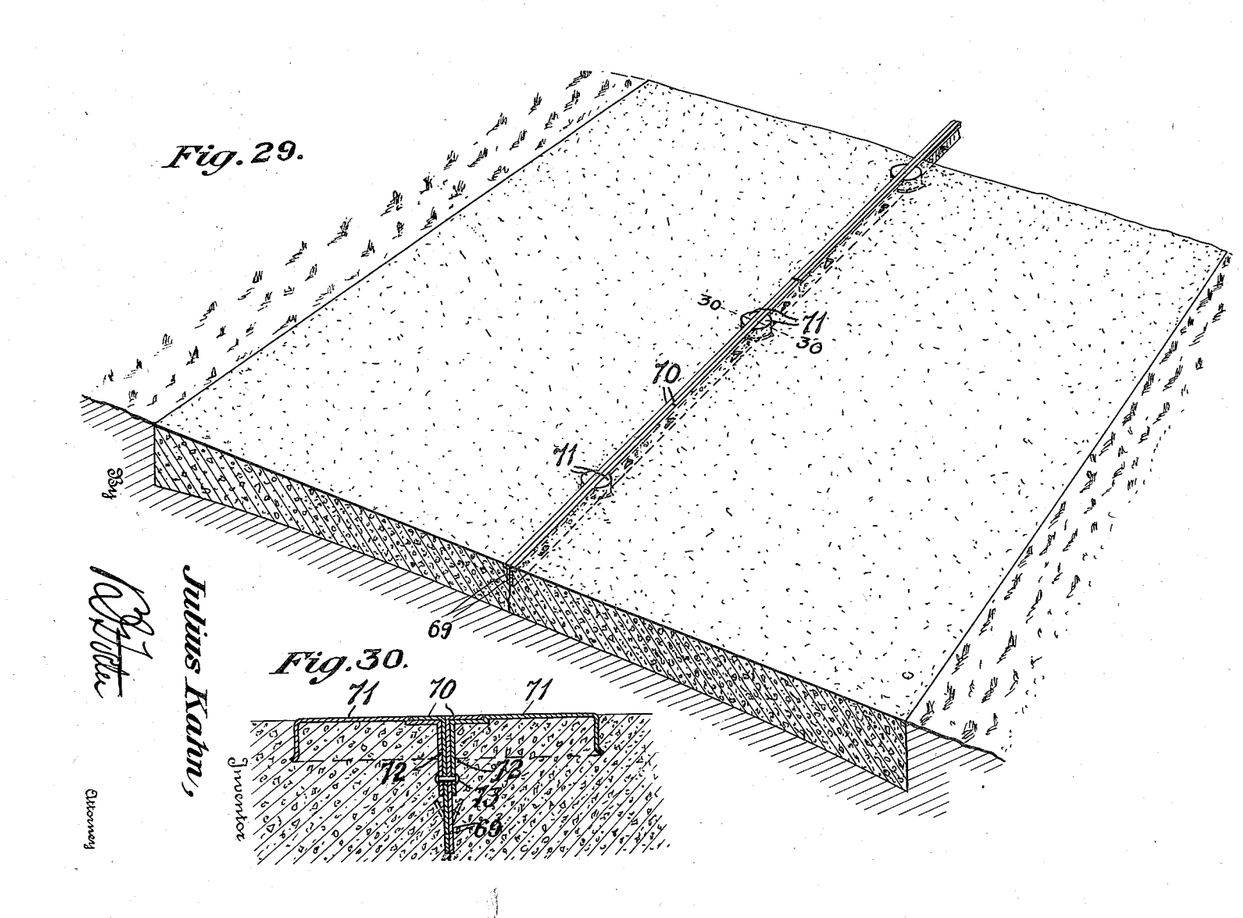
Figure 29 is a perspective view of still another and important form the invention may take.
Figure 30 is a sectional view on the line 30—30 of Figure 29.

The structure shown in Figures 29 and 30 is a practical and desirable development of the invention. Therein the cleavage creating strip is located with its upper edge at the surface of the roadway and thus may be made to act as a traffic guide or marker between the individually spaced marker members.

As shown the strip is composed of angle metal sections, the vertical flanges 69 being suitably secured together as by welding and the horizontal flanges 70 being arranged in oppositely outstanding relation with their upper faces substantially flush with the surface of the roadway. At intervals are the marking members 71 with their heads embedded in the material of the roadway and their depending arms 72 fastened at their lower ends to the strips by rivets 73 or in any other suitable manner as welding.

Thus the flanges 70 act as a line guide and at intervals the "buttons" formed by a pair of associated members show.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. Traffic marking means for highways comprising a plurality of members spaced from one another longitudinally along the highway for embedment in the sections of the roadway along the line of cleavage that defines said roadway sections, said members being movable with the roadway sections in which they are embedded on the expansion and contraction of the said sections and being individually free from the contiguous roadway sections on the opposite side of the line of cleavage, and anchoring means for said members adapted to be embedded in the roadway and having connections with said members, said connections permitting the movements of the members with the roadway sections and with relation to the anchoring means.

2. Traffic marking means for highways comprising an anchor member for embedment in the roadway in contact with the material thereof and held thereby, and a plurality of spaced marking members for embedment in the surface of said roadway and movable with the portions of the same in which they are embedded, and means movable with respect to the anchor member and connecting the marking members and anchor member and permitting the movement of the members with the roadway and with respect to said anchor member.

3. Traffic marking means for highways comprising a cleavage-creating strip for embedment in a road bed in contact with and held by the material thereof, and a traffic marking device for embedment in the surface of said road bed and having means for attachment to the strip, said means acting to maintain said connection while permitting the marking device to move with respect to the strip and with the portion of the road bed in which the marking device is embedded.

4. Traffic marking means for highways comprising a cleavage creating strip for embedment in a roadway in contact with and held by the material thereof, a traffic marker for embedment in the surface of the roadway, and a movable arm connecting the marker and the strip to permit the marker to move with the roadway upon its contraction and expansion and permitting said movement with respect to the strip.

5. Traffic marking means for highways comprising sets of traffic marking members for embedment in the surface of a roadway on opposite sides of a cleavage joint and spaced apart longitudinally along the same, the members of a set being respectively movable with the sections of the roadway on opposite sides of the cleavage joint upon their contraction and expansion, and yielding means connecting the members and permitting their respective movements.

6. Traffic marking means for highways comprising sets of spaced traffic marking members having exposed top walls and skirts for embedment in the roadway on opposite sides of a cleavage joint in said roadway, said members of the various sets being movable toward and from each other on the expansion and contraction of the roadway on opposite sides of the joint, and a depending yoke connecting the members and adapted to bridge the cleavage joint.

7. In combination with a cleavage creating strip for embedment in a roadway in contact with the material thereof and being anchored by the same, of a traffic marker member for embedment in the surface of the roadway adjacent and wholly on one side of the cleavage joint created by the strip, and a yoke carried by the marker member and embracing the strip.

8. In combination with a cleavage creating strip for embedment in a roadway, of a plurality of traffic marker members for embedment in the surface of the roadway adjacent the cleavage joint created by the strip, and a yoke connecting the members and embracing the strip, said strip being exposed between the yokes for engagement with the material of the roadway.

9. In combination with an anchor member for embedment in a roadway, of a plurality of traffic marker members for embedment in the surface of the roadway, and spaced yokes connecting the marking members and embracing the anchor member, leaving the portions of the anchor member between the yokes exposed to the material of the roadway.

10. In combination with a cleavage creating strip for embedment in a roadway, of a plurality of traffic markers including top walls for exposure and side skirts that are embedded in the roadway, said markers being located on opposite sides of the cleavage joint created by the strip, and yokes connecting the markers and embracing the strip at spaced points, said yokes permitting the relative movement of the markers and anchoring them in the roadway.

11. A roadway, a cleavage creating strip embedded in the roadway and in contact with the material thereof, a traffic marking member in the surface of the roadway, said member being fixed to the portion of the roadway at one side and free from the portion at the other side of the strip and a connection between the marking member and the strip that permits the marker to move transversely of the strip with the portion of the roadway in which it is located, as the latter expands and contracts.

12. A roadway, a cleavage creating strip embedded in the roadway and in contact with the material thereof, a plurality of traffic marking members located in the surface of the roadway respectively at opposite sides of the strip, and connections between the marking members and strip that anchor the members and permit their relative lateral movement as the roadway contracts and expands, leaving portions of the strip exposed and in contact with the material of the roadway.

13. A roadway, a cleavage creating strip embedded in the roadway and in contact with the material thereof, being anchored in place thereby, a plurality of traffic marking members respectively located in the surface of the roadway on opposite sides of the strip, and a loop connecting the members and embracing the strip.

14. Traffic marking means for roadways comprising a joint creating strip for embedment in a roadway and having offset means for interlocking with the material therein to hold the strip against displacement, and marking devices offset with respect to the vertical plane of the strip and having means engaged therewith to secure them to the same, said traffic devices being adapted for embedment in the surface of the roadway at one side of the joint created by the strip and said means allowing the marking devices to move with the portion of the roadway in which they are embedded and with respect to the strip.

JULIUS KAHN.